US008621143B2

(12) United States Patent
Purdy et al.

(10) Patent No.: US 8,621,143 B2
(45) Date of Patent: Dec. 31, 2013

(54) ELASTIC DATA TECHNIQUES FOR MANAGING CACHE STORAGE USING RAM AND FLASH-BASED MEMORY

(75) Inventors: Cameron Purdy, Lexington, MA (US); Christer Fahlgren, San Francisco, CA (US); Gene Gleyzer, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 152 days.

(21) Appl. No.: 13/239,238

(22) Filed: Sep. 21, 2011

(65) Prior Publication Data

US 2012/0265924 A1 Oct. 18, 2012

Related U.S. Application Data

(60) Provisional application No. 61/476,238, filed on Apr. 15, 2011, provisional application No. 61/479,340, filed on Apr. 26, 2011.

(51) Int. Cl.
*G06F 13/00* (2006.01)

(52) U.S. Cl.
USPC .... 711/103; 711/162; 711/202; 711/E12.002; 710/52

(58) Field of Classification Search
USPC ............ 711/103, 162, 202, E12.002; 710/52
See application file for complete search history.

(56) References Cited

U.S. PATENT DOCUMENTS

| 2011/0119442 | A1* | 5/2011 | Haines et al. | 711/113 |
| 2011/0138106 | A1* | 6/2011 | Prabhakaran et al. | 711/103 |
| 2011/0238886 | A1* | 9/2011 | Post et al. | 711/103 |
| 2011/0296079 | A1* | 12/2011 | Kotzur et al. | 711/103 |

* cited by examiner

*Primary Examiner* — Edward Dudek, Jr.
(74) *Attorney, Agent, or Firm* — Fliesler Meyer LLP (57) ABSTRACT

A set of data caching techniques are described which are used to seamlessly store data across both RAM and flash based memory. The techniques utilize a memory manager that includes a RAM journal and a flash journal to efficiently store the data and to make the management of the data across both mediums transparent to the user. The flash based journal works in conjunction with the RAM journal and takes the overflow of data from the RAM journal when certain capacity limits are reached. The resource manager uses journaling techniques to write data to the cache and manages the garbage collection created by the data journaling.

19 Claims, 5 Drawing Sheets

ELASTIC DATA TECHNIQUES FOR MANAGING CACHE STORAGE USING RAM AND FLASH-BASED MEMORY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

The present application claims the benefit of the following U.S. Provisional Patent Applications, which are incorporated by reference herein in their entireties:

U.S. Provisional Patent Application No. 61/476,238, entitled "ELASTIC DATA TECHNIQUES FOR MANAGING MEMORY USING RAM AND FLASH DISK MEMORY," by Cameron Purdy et al., filed on Apr. 15, 2011; and U.S. Provisional Patent Application No. 61/479,340, entitled "DISTRIBUTED DATA GRID INCLUDING ELASTIC DATA, CLIENT CONNECTIVITY, INDEXING, CONFIGURATION VALIDATION AND ATOMIC PARTITION LEVEL OPERATIONS," by Cameron Purdy et al., filed on Apr. 26, 2011.

FIELD OF THE INVENTION

The current invention generally relates to data storage and data caching techniques in computing environments.

BACKGROUND

Traditionally, caching techniques have involved storing a subset of data in random access memory (RAM), which provides significantly faster access to the data than disk-based storage. It is usually desirable to avoid reading the data from disk because disk access is often two or more orders of magnitude slower than accessing the same data stored in RAM. A frequent limitation to RAM, however, is that it is prohibitively expensive and thus too limited in size to contain all of the necessary data.

In recent years, several new disk technologies have emerged, which are flash-based and which use semiconductor technology. For example, flash-based solid state disks (SSD) are devices that use microchips which retain data in non-volatile memory chips and contain no moving parts. Unlike hard drive based disks, SSDs are typically less susceptible to physical shock, are usually silent, and have lower access time and latency for data access. In many cases, SSDs are only one order of magnitude slower than RAM and therefore provide a significant speed advantage over hard drive disks, especially for performing data reads.

It has therefore become desirable to utilize certain caching techniques that specifically take advantage of these new disk technologies (e.g. flash-based SSD based storage), especially when such technologies are utilized in combination with random access memory. It is also desirable to bridge the management of the data stored across multiple forms of storage and to make that data management appear seamless to users and applications. Applicants have identified these, as well as numerous other needs that currently exist in the art in coming to conceive the subject matter of the present disclosure.

BRIEF SUMMARY OF THE INVENTION

A set of data storage and caching techniques are described which are used to seamlessly store data across both random access memory (RAM) and flash based memory such as flash-based solid state disks (SSDs). The techniques utilize a memory resource manager that includes a RAM journal and a flash journal to efficiently store the data to make the management of the data across both forms of medium transparent to the user.

The resource manager maintains an in-memory index to cached data that is being managed. The in-memory index compresses the primary keys associated with data entries into an efficient tree structure that provides an index into the memory blocks storing the data entries. Each primary key refers to a location within a memory block where the associated data is stored. When the resource manager receives state changes to the data entries, it batches those state changes until enough data is modified to warrant performing a full write of a new memory block. Once enough changes have been batched to warrant a write, the resource manager writes the batch of state changes using a journaling approach that appends a new memory block to the end of a file. The primary keys associated with the modified data entries are then re-linked to reference the new memory block. The memory blocks containing the stale data entries are left untouched at the time of modification and are later garbage collected asynchronously without stopping operation of the cache. The flash based journal works in conjunction with a RAM journal such that data from the RAM journal overflows to the flash based journal when certain capacity limits are reached.

DETAILED DESCRIPTION

In accordance with various embodiments of the invention, a set of data management and storage techniques are described which are used to seamlessly store and manage data across RAM and flash-based memory such as flash-based solid state disks (SSDs). In particular, these techniques can be especially tuned to take advantage of fast disk-based devices such as Solid State Disks (SSD) and enable near memory speed while storing and reading data from SSDs.

Figure 1:
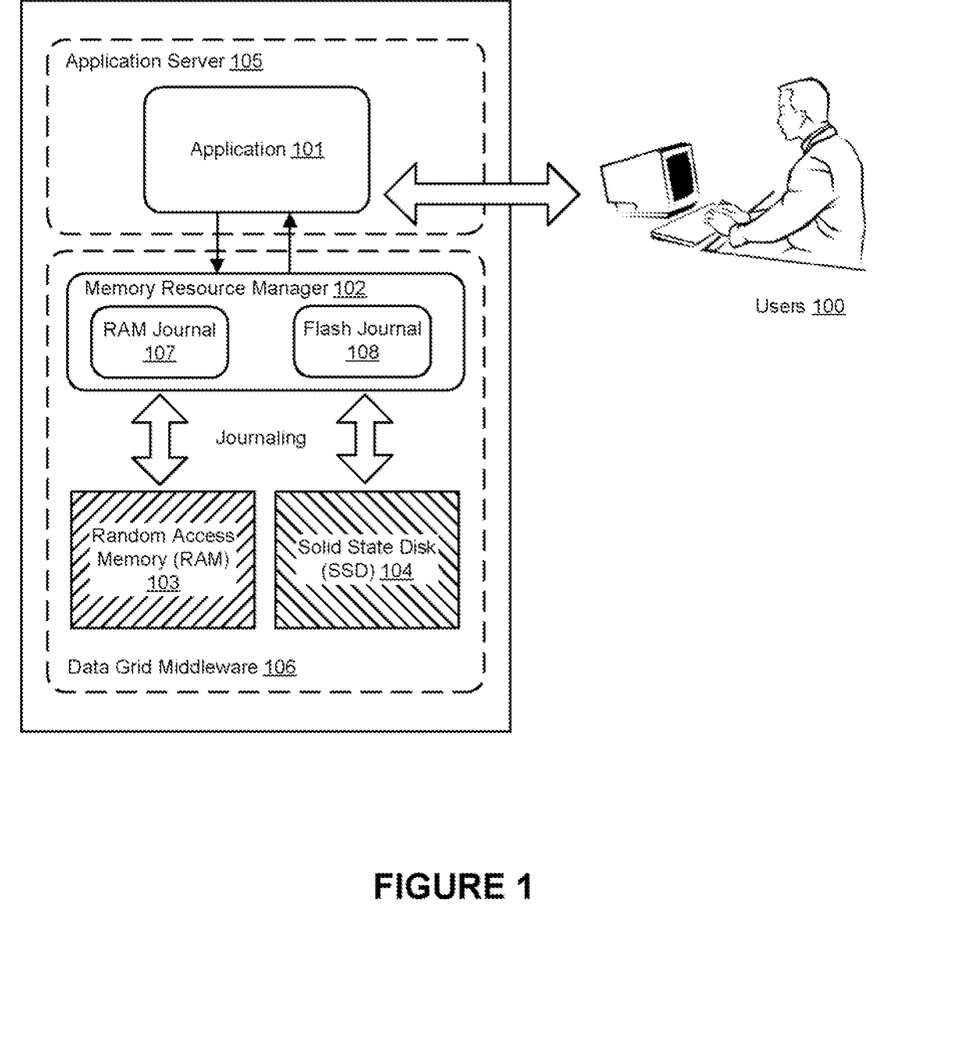
FIG. 1 is an illustration of a memory resource manager utilizing elastic data techniques in accordance with various embodiments of the invention.

FIG. 1 is an illustration of a memory manager utilizing elastic data techniques in accordance with various embodiments of the invention. Although this diagram depicts components as logically separate, such depiction is merely for illustrative purposes. It will be apparent to those skilled in the art that the components portrayed in this figure and in other figures can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

In accordance with the illustrated embodiment, a memory resource manager 102 makes data storage transparent to users 100 and applications 101, whether that data is being stored in random access memory 103 or on flash memory, such as an SSD 104. In accordance with an embodiment, the resource manager 102 is comprised of a RAM journal 107 and a flash journal 108. The RAM journal works in combination with the flash journal to enable seamless overflow to flash-memory. In other words, the cache storage to the application appears as one contiguous heap of memory, while the resource manager 102 manages the placement of data blocks into RAM and SSD. The application does not need to specify what happens when the RAM is full, because the resource manager takes care of writing the data to the flash disk-based storage whenever RAM becomes full and otherwise manages the data storage.

When storing data, the resource manager makes best use of the RAM that is available and overflows the remaining data to the SSD-based storage. For example, as long as there is enough RAM available, the resource manager will use the RAM to store the data. Disk storage can occur under several conditions (1) when there is no longer RAM space available, the data will be overflowed to the disk-based storage; and (2) backup or redundant copies of data can be stored directly to disk storage instead of memory.

In order to take advantage of flash-based SSD technology, the resource manager 102 can batch changes and write them to disk in large blocks, which are aligned with the native block size of the flash-based SSD device 104. For example, internally, a typical flash-based SSD writes data in memory blocks of 256 kilobytes (kb) in size. Often there is no way to modify a memory block that is smaller than 256 kb even if only a single byte needs to be changed. I.e. if a single byte needs to be modified in a file, it means reading the 256 kb sized block(s) that needs to be modified and write the modified 256 kb block out again to the flash chip. This means that small operations are comparatively much more expensive than operations aligned with the block size. The resource manager therefore can batch changes and write them in identical size blocks (i.e. 256 kb) in order to match the block size of the SSD. This can produce significant speed and efficiency advantages when writing data onto flash memory. It should be noted that these block characteristics (256 kb) are relevant for flash-based SSD, which comprise the majority of all SSDs, however, there may exist other SSD technologies where the block characteristics are different. The embodiments described throughout the present disclosure are not necessarily limited to any particular block characteristic or specific type of SSD technology.

In accordance with an embodiment, the resource manager 102 can be provided as part of a data grid middleware 106 product that is used to manage access to data for application objects. The data grid can be a system composed of multiple servers that work together to manage information and related operations—such as computations—in a distributed environment. The data grid is used as a data management system for application objects that are shared across multiple servers, require low response time, high throughput, predictable scalability, continuous availability and information reliability. As a result of these capabilities, the data grid is ideally suited for use in computational intensive, stateful middle-tier applications. The data management is targeted to run in the application tier, and is often run in-process with the application itself, for example within the application server 105 cluster or in conjunction with the application server. In accordance with an embodiment, the data grid software is middleware that reliably manages data objects in memory across a plurality of servers and also brokers the supply and demand of data between applications and data sources.

In accordance with an embodiment, the resource manager 102 manages data by treating the available memory as a journal, whereby changes are always appended at the end of the current file. For example, when updating a particular piece of data associated with a key, the actual memory space storing that information is not changed, rather a new entry is created and the new entry is linked to primary key associated with the old entry and identified as being the current version. This style of data writing creates garbage where previous versions of entries are no longer useful. These entries can subsequently be garbage collected to clear the storage space. This garbage collection can be triggered by certain ratios of garbage or can also be triggered by time. For example, upon expiration of a certain time interval (e.g. 2 seconds) the resource manager can check the file to determine whether it warrants collection. As another example, certain triggers can be established as thresholds in memory, wherein when the block reaches a certain percentage of old entries, the resource manager can determine whether to garbage collect that block. In accordance with an embodiment, the garbage collection can be performed concurrently with execution, without halting the processing and writing of other data. Garbage collection will be described in further detail with reference to FIG. 3.

In accordance with an embodiment, data managed in a data grid can be stored as a primary/backup system, where the data grid maintains a redundant copy of the data in order to provide continuous service of the stored data even if a node storing data becomes unavailable. In a data grid, the typical data access pattern means that primary values are accessed for read more often than backups, meaning it is an advantage to have the primary values in RAM. To optimize the usage of RAM, embodiments of the invention use RAM for both primary and backup values up until a defined threshold of memory usage after which the backups are evacuated to disk freeing up memory for more primary values to be stored in memory. In accordance with an embodiment, once the threshold is reached, backups will always be stored on disk.

Figure 2:
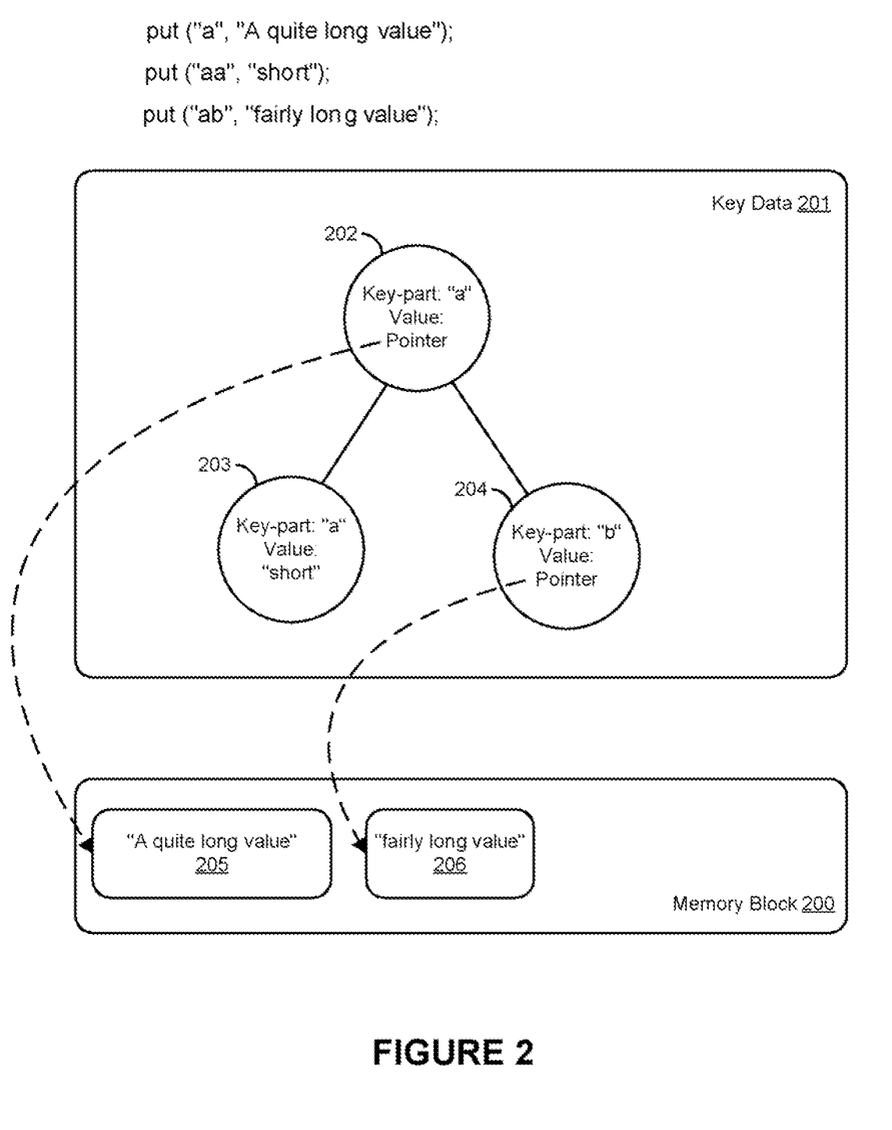
FIG. 2 is an illustration of the primary keys used by the resource manager to store data, in accordance with various embodiments of the invention.

FIG. 2 is an illustration of the primary keys used by the resource manager to store data, in accordance with various embodiments of the invention. In accordance with the illustrated embodiment, primary keys 202, 203, 204 of the data are compressed into the efficient tree data structure 201 which acts as an index for memory blocks in RAM and flash disk. Stated differently, each primary key in the tree can be a link to a memory block stored in memory. In accordance with an embodiment, keys are serialized objects and thus can take up a significant amount of memory. The compression of the keys in the tree structure can reduce the memory footprint of the primary keys of the data.

When a key is looked up, the key is treated as a binary string to find the tree node that references the data structure in the RAM or disk. When new values are written, the node is re-referenced to the newer value, and the older values will eventually be garbage collected, as previously mentioned. In addition, certain smaller values of data (other than the key)

can be stored directly in the tree. As a simple example, all values up to 7 bytes can be stored directly in the tree, while all larger values will be stored into large memory buffers and overflowed to disk when RAM is full. This can further optimize the data storage by eliminating the need to leave the tree structure when reading smaller values.

In accordance with the illustrated embodiment, a sequence of three "put" operations used to store 3 different cache entries into the cache is shown. The first operation creates a primary key node 202 (root) which contains a reference to data entry 205 storing "a quite long value". The second operation creates primary key node 203, however, because the cache data entry is "short" in size (e.g. is less than 7 bytes), it is stored directly in the tree structure along with the primary key 203. As such, primary key 203 contains no link to memory block 200. Finally, the third operation creates primary key node 204 which contains a reference to data entry "fairly long value" 206 stored in memory block 200. It should be noted that in this embodiment, each key is treated as a binary string that can be used to traverse the tree structure to the correct node containing a link to the data entry (or containing the data entry in the node itself). It should also be noted that the data entries referenced by the tree nodes can be stored in RAM or flash disk depending on the various factors and algorithms described throughout this disclosure.

Figure 3:
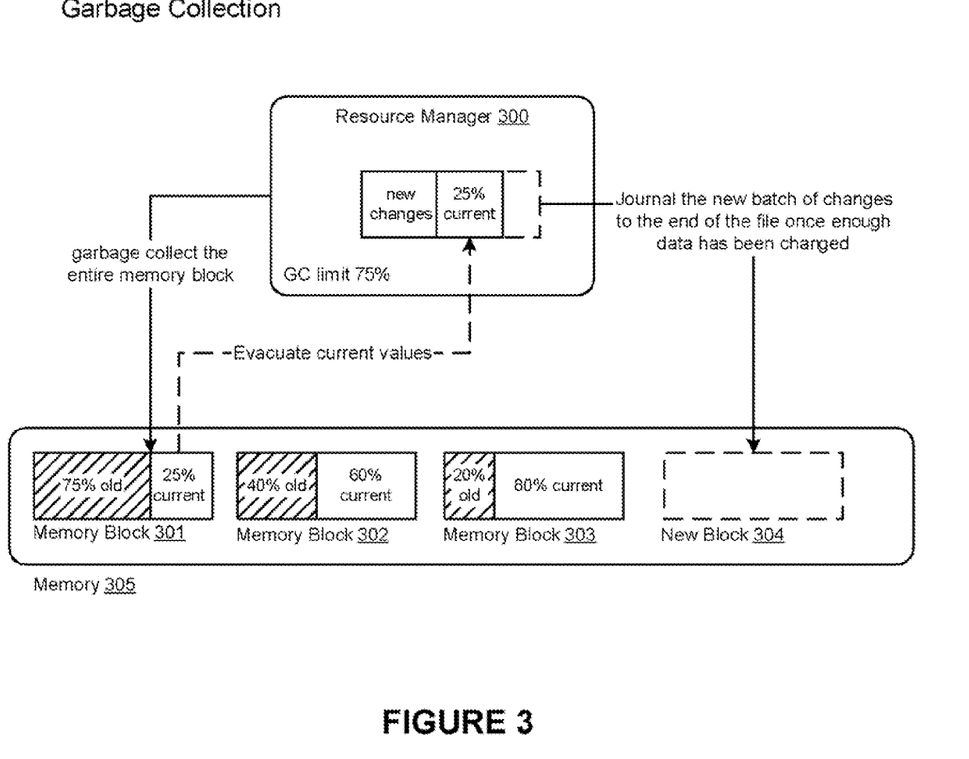
FIG. 3 is an illustration of the garbage collection used to clean up storage space when using elastic data, in accordance with various embodiments of the invention.

FIG. 3 is an illustration of the garbage collection used to clean up storage space when using elastic data, in accordance with various embodiments of the invention. In accordance with the illustrated embodiment, the garbage collection (GC) is performed by the resource manager 300. As previously mentioned, the resource manager 300 uses journaling to record state changes, which appends the new values to the end of the cache, while maintaining the older values in storage. This creates garbage when the values are modified and are no longer linked to by any primary key. It is therefore desirable to garbage collect these stale data entries in order clear memory space.

In accordance with an embodiment, GC can be triggered by time and/or by the ratio of current values to stale values (garbage) in each memory block. For example, the resource manager 300 can periodically (e.g. every X seconds) initiate garbage collection, at which point it can iterate through the memory blocks 301, 302, 303 and determine whether each memory block contains stale values to warrant collection. As illustrated in the figure, if the GC ratio limit is set at 75%, the resource manager inspects the memory block 301, determines that 75% of the entries in the block are stale and decides that this memory block is ready to be garbage collected. At this point, the resource manager can evacuate the remaining 25% of the entries which are still current by adding them to the new state changes which are being batched. The current entries will be written to the new block 304 when the resource manager journals the new state changes to the file. Once the current values have been evacuated in this manner, the memory block 301 can be recycled.

In accordance with an embodiment, the garbage collection ratio can be adjusted differently for RAM and flash disk in order to optimize performance of the data operations. For example, because RAM operations are relatively inexpensive in terms of latency, and because RAM is often limited in size, the RAM journal manager can perform garbage collection very aggressively. Conversely, because flash (SSD) operations are more expensive in terms of latency, but often have substantially more storage capacity, the flash journal manager can perform garbage collection in a more conservative manner. As an illustration, the GC ratio limit for the RAM journal can be set at 16% (meaning that as soon 16% of the data entries in the memory block have become stale, the block is ready to be collected), while the GC ratio limit for the flash journal can be set at 75%. In accordance with an embodiment, setting separate GC ratio limits for RAM and flash in such a manner can optimize the read/write operations and improve performance of the cache.

It should be noted that in accordance with various embodiments, garbage collection is performed asynchronously in the background, without halting any ongoing operations in the cache. This can provide significant latency advantages for data access and can eliminate the "stop the world" garbage collection which has been a significant problem for Java Virtual Machines (JVMs) in the past.

Figure 4:
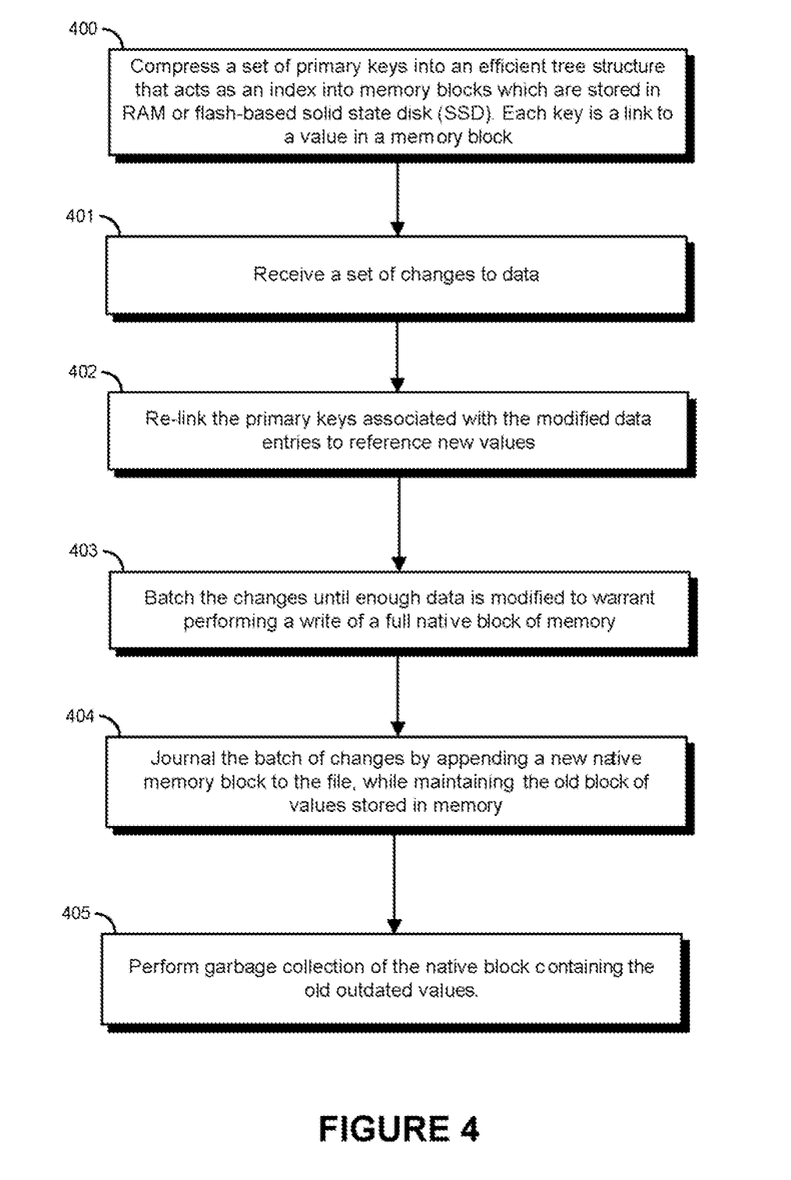
FIG. 4 is a flow chart illustration of a process for using elastic data techniques to store data, in accordance with various embodiments of the invention.

FIG. 4 is a flow chart illustration of a process for using elastic data techniques to store data, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As illustrated in step 400, the set of primary keys are compressed into an efficient tree data structure that provides an index into data entries stored in RAM or on SSD. In accordance with an embodiment, each primary key node in the tree either contains a link to the data entry stored in the memory block or stores the data entry in the node itself. In step 401, the resource manager receives a set of state changes to the data entries. The primary key nodes are then re-linked in the tree to point to the new values, as shown in step 402.

In accordance with an embodiment, the resource manager can continue to receive state changes and batch those changes until enough data has been modified to warrant performing a full write of a native block of memory to RAM or SSD, as shown in step 403. Once enough data has been modified to fill up a memory block of native size, the resource manager can perform the write using a journaling technique, as shown in step 404. In accordance with an embodiment, journaling the state changes includes appending the new memory block to the end of the file. At this point, the old memory block containing the stale values is still maintained in memory or on disk. Subsequently, the resource manager can asynchronously perform garbage collection of the old memory blocks, when enough stale values have accumulated in each block to warrant clean up, as shown in step 405.

Figure 5:
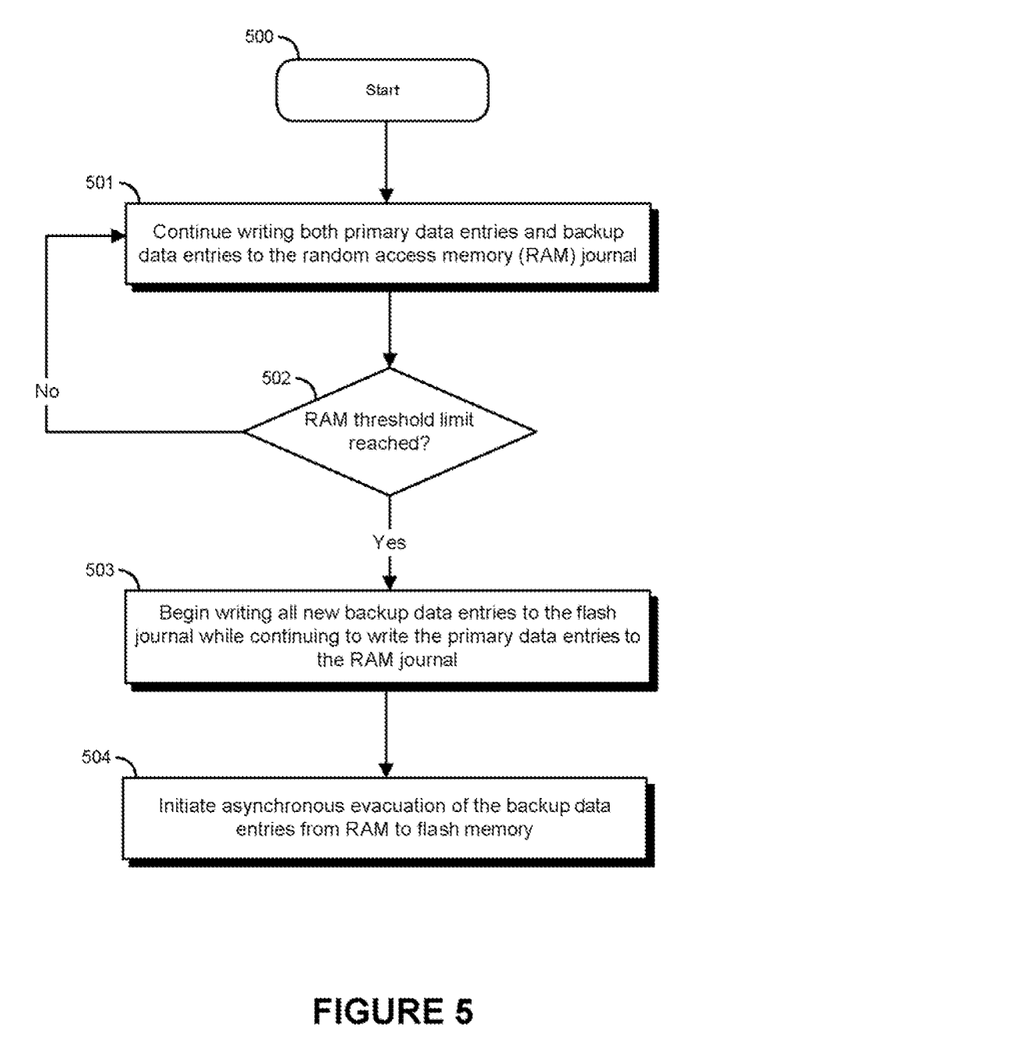
FIG. 5 is a flow chart illustration of a process for the resource manager to write primary entries and backup entries into the cache, in accordance with various embodiments of the invention.

FIG. 5 is a flow chart illustration of a process for the resource manager to write primary entries and backup entries into the cache, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

In accordance with various embodiments, there can be at least two types of data entries—primary data entries and corresponding backup data entries. The primary data entries contain the data most often accessed by the various users and applications, while the backup data entries are used for failover and high availability in case of failure of a node containing the primary entries. It is therefore preferable that the backup entries are maintained on separate machines (nodes) from their corresponding primary entries.

In vast majority of instances, the primary data entries will be accessed substantially more often than the backup entries. In light of this, it can be advantageous for the resource manager to use a heuristic of preferring the storage of primary data entries in RAM, while maintaining the backup entries in flash based memory. However, in deployments having large amounts of RAM, it may be advantageous to store both primary and backup entries in RAM while storage space is abundant. The process illustrated in FIG. 5 can be used to store both primary and backup entries in RAM while space is available and gradually transition the backup entries from RAM into flash memory if RAM capacity becomes scarce.

The process is initiated in step 500. Once the process has started, the resource manager can write both the primary data entries and the backup data entries to RAM, as shown in step 501. The resource manager can continue writing both types of entries to RAM until a predetermined threshold capacity limit of RAM is reached, as shown in step 502. For example, the threshold limit for RAM may be set to be 92%, in which case the resource manager would continue writing both primary and backup entries until RAM was 92% full. Once the limit has been reached, the resource manager can begin writing all new backup data entries to flash (SSD) while continuing to write the primary entries to RAM, as shown in step 503. Further, once the limit has been reached, the resource manager can trigger an asynchronous evacuation process that can begin transferring the existing backup entries from RAM to flash memory, as shown in step 504. The evacuation process can evacuate the backup entries from RAM to flash memory and the memory blocks would subsequently be collected over the following GC cycles.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for storing and caching data in computing environments, said method comprising:
    compressing a set of primary keys into a tree data structure that provides an index into data entries stored in either random access memory (RAM) or flash-based memory, wherein each primary key is a reference to a data entry in a memory block stored in said RAM or said flash-based memory, wherein the data entries further include a set of primary data entries and a set of backup data entries, wherein both said primary data entries and said backup data entries are written to said RAM until said RAM reaches a predetermined capacity threshold;
    receiving a set of state changes to the data entries;
    re-linking the primary keys associated with the modified data entries to reference new values;
    batching the state changes until enough data is modified to warrant performing a full write of a new memory block; and
    journaling the batch of state changes by appending the new memory block to the RAM or the flash memory storing the data entries.

2. The method of claim 1, further comprising:
    performing garbage collection of the memory blocks containing the data entries which have been modified and are stale.

3. The method of claim 2, wherein performing said garbage collection further includes:
    inspecting a memory block and determining a ratio of stale data entries contained in said memory block;
    evacuating the current data entries from said memory block if the ratio of said stale data entries is above a predetermined threshold limit, wherein the current data entries are evacuated by journaling the current data entries to the new memory block; and
    recycling the memory block.

4. The method of claim 3, wherein the predetermined threshold limit for the RAM is different from the predetermined threshold limit for said flash memory.

5. The method of claim 1, wherein after reaching said capacity threshold, all new backup data entries are written to a solid state disk (SSD) and wherein the backup data entries are asynchronously evacuated from said RAM after reaching said capacity threshold.

6. The method of claim 1, wherein batching the state changes until enough data is modified to warrant performing a full write of a new memory block further comprises:

determining that the modified data entries amount to enough storage space to fill a native memory block size of a flash-based solid state disk (SSD).

7. The method of claim 1, wherein the new memory blocks are written to random access memory (RAM) until a predetermined capacity limit of said RAM is reached, and wherein after reaching said capacity limit, the new memory blocks are written to flash memory.

8. A system for storing and caching data in computing environments, said system comprising:
a random access memory (RAM);
a solid state disk (SSD); and
a resource manager that writes data to said RAM and said SSD using data journaling that records state changes as a sequence of new data entries while maintaining stale data entries in storage, wherein if the resource manager exceeds space in RAM, the resource manager writes said data to the SSD using said data journaling,
wherein the data entries further include a set of primary data entries and a set of backup data entries, wherein the resource manager writes both said primary data entries and said backup data entries to said RAM until said RAM reaches a predetermined capacity threshold.

9. The system of claim 8, wherein the resource manager compresses a set of primary keys associated with the data entries into a tree data structure, wherein said tree data structure provides an index into memory blocks storing the data entries in either one of said RAM or said SSD.

10. The system of claim 9, wherein the resource manager performs garbage collection of the memory blocks containing the stale data entries which have been modified.

11. The system of claim 10, wherein performing said garbage collection further includes:
inspecting a memory block and determining a ratio of stale data entries contained in said memory block;
evacuating the current data entries from said memory block if the ratio of said stale data entries is above a predetermined threshold limit, wherein the current data entries are evacuated by journaling the current data entries to the new memory block; and
recycling the memory block.

12. The system of claim 11, wherein the predetermined threshold limit for the RAM is different from the predetermined threshold limit for said SSD.

13. The system of claim 9, wherein after reaching said capacity threshold, the resource manager writes all new backup data entries to a solid state disk (SSD) and initiates evacuation of the backup data entries from said RAM.

14. The system of claim 8, wherein the resource manager batches the state changes until enough data is modified to warrant performing a full write of a new memory block, and
wherein the resource manager performs the full write upon determining that the modified data entries amount to enough storage space to fill a native memory block size of a solid state disk (SSD).

15. The system of claim 8, wherein the resource manager writes new memory blocks to random access memory (RAM) until a predetermined capacity limit of said RAM is reached, and wherein after reaching said capacity limit, the resource manager writes the new memory blocks to flash memory.

16. A non-transitory computer readable storage medium storing a set of instructions executed by one or more hardware processors to perform a set of steps comprising:
compressing a set of primary keys into a tree data structure that provides an index into data entries stored in either random access memory (RAM) or flash memory, wherein each primary key is a reference to a data entry in a memory block stored in said RAM or said flash memory, wherein the data entries further include a set of primary data entries and a set of backup data entries, wherein both said primary data entries and said backup data entries are written to said RAM until said RAM reaches a predetermined capacity threshold;
receiving a set of state changes to the data entries;
batching the state changes until enough data is modified to warrant performing a full write of a new memory block;
journaling the batch of state changes by appending the new memory block to the RAM or the flash memory storing the data entries; and
re-linking the primary keys associated with the modified data entries to reference the new memory block.

17. A method for storing and caching data in computing environments, said method comprising:
compressing a set of primary keys into a tree data structure that provides an index into data entries stored in either random access memory (RAM) or flash-based memory, wherein each primary key is a reference to a data entry in a memory block stored in said RAM or said flash-based memory, wherein data entries that are smaller than a predetermined threshold limit are stored directly into the tree data structure, and data entries larger than said threshold limit are stored into memory blocks referenced by the primary keys in the tree data structure;
receiving a set of state changes to the data entries;
re-linking the primary keys associated with the modified data entries to reference new values;
batching the state changes until enough data is modified to warrant performing a full write of a new memory block; and
journaling the batch of state changes by appending the new memory block to the RAM or the flash memory storing the data entries.

18. A system for storing and caching data in computing environments, said system comprising:
a random access memory (RAM);
a solid state disk (SSD); and
a resource manager that writes data to said RAM and said SSD using data journaling that records state changes as a sequence of new data entries while maintaining stale data entries in storage, wherein if the resource manager exceeds space in RAM, the resource manager writes said data to the SSD using said data journaling,
wherein the resource manager compresses a set of primary keys associated with said data entries into a tree data structure, and wherein the resource manager stores data entries that are smaller than a predetermined threshold limit directly into the tree data structure and stores data entries larger than said threshold limit into the memory blocks referenced by the primary keys of the tree data structure.

19. A non-transitory computer readable storage medium storing a set of instructions executed by one or more hardware processors to perform a set of steps comprising:
compressing a set of primary keys into a tree data structure that provides an index into data entries stored in either random access memory (RAM) or flash memory, wherein each primary key is a reference to a data entry in a memory block stored in said RAM or said flash memory, wherein data entries that are smaller than a predetermined threshold limit are stored directly into the tree data structure, and data entries larger than said threshold limit are stored into memory blocks referenced by the primary keys in the tree data structure;
receiving a set of state changes to the data entries;

batching the state changes until enough data is modified to warrant performing a full write of a new memory block;

journaling the batch of state changes by appending the new memory block to the RAM or the flash memory storing the data entries; and re-linking the primary keys associated with the modified data entries to reference the new memory block.

\* \* \* \* \*